United States Patent
Esaki et al.

(10) Patent No.: US 8,018,825 B2
(45) Date of Patent: Sep. 13, 2011

(54) OPTICAL RECORDING MEDIUM AND METHOD OF RECORDING/READING IT

(75) Inventors: Akira Esaki, Yokohama (JP); Takeshi Kuriwada, Minato-ku (JP); Tomokazu Iwasaki, Yokkaichi (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 12/677,847

(22) PCT Filed: Sep. 5, 2008

(86) PCT No.: PCT/JP2008/066101
§ 371 (c)(1),
(2), (4) Date: Mar. 12, 2010

(87) PCT Pub. No.: WO2009/034931
PCT Pub. Date: Mar. 19, 2009

(65) Prior Publication Data
US 2010/0214901 A1    Aug. 26, 2010

(30) Foreign Application Priority Data
Sep. 14, 2007   (JP) .................................. 2007-239974

(51) Int. Cl.
*G11B 3/70* (2006.01)

(52) U.S. Cl. ........................................ 369/283; 369/288

(58) Field of Classification Search .................... None
See application file for complete search history.

(56) References Cited

U.S. PATENT DOCUMENTS

| | | |
|---|---|---|
| 6,645,596 B1 | 11/2003 | Murakami et al. |
| 2002/0051423 A1 | 5/2002 | Hayashida et al. |
| 2005/0267230 A1 | 12/2005 | Esaki et al. |
| 2008/0102262 A1 | 5/2008 | Esaki et al. |

FOREIGN PATENT DOCUMENTS

| | | |
|---|---|---|
| JP | 2000-169691 | 6/2000 |
| JP | 2000-173101 | 6/2000 |
| JP | 2000-191767 | 7/2000 |
| JP | 2002 163838 | 6/2002 |
| JP | 2002-212410 | 7/2002 |
| JP | 2003-231725 | 8/2003 |
| JP | 2004 22122 | 1/2004 |
| JP | 2004-359779 | 12/2004 |
| JP | 2005-36184 | 2/2005 |
| JP | 2006-161030 | 6/2006 |

OTHER PUBLICATIONS

Chinese Office Action issued Apr. 26, 2011, in Chinese Patent Application No. 200880106876.7, filed Sep. 5, 2008 (with English-language Translation).

*Primary Examiner* — Paul Huber
(74) *Attorney, Agent, or Firm* — Oblon, Spivak, McClelland, Maier & Neustadt, L.L.P.

(57) ABSTRACT

To provide an optical recording medium of which mechanical properties and storage stability will not be impaired, and which will show little deterioration in signal properties even after being left to stand at high temperature under high humidity.
An optical recording medium to perform recording/reading by means of blue laser, which has a value of 10 or less as obtained by "error rate after its environmental resistance test/error rate before its environmental resistance test" in error rates obtained before and after its environmental resistance test carried out by leaving the medium to stand for 500 hours at a temperature of 80° C. under a relative humidity of 80%.

10 Claims, 1 Drawing Sheet

OPTICAL RECORDING MEDIUM AND METHOD OF RECORDING/READING IT

This application is a 371 of PCT/JP2008/066101, filed Sep. 5, 2008.

TECHNICAL FIELD

The present invention relates to an optical recording medium having excellent recording properties and a method of recording/reading it.

BACKGROUND ART

As a specific example of use of a radiation-curable composition for a cover coat layer of an information recording layer in an optical recording medium, the present inventors have previously filed an application for a patent relating to an optical recording medium employing a radiation-curable composition comprising silica particles made of a hydrolyzate of an oligomer of an alkoxysilane and e.g. a monomer having a urethane bond such as urethane (meth)acrylate and/or its oligomer (see Patent Document 1).

Further, an optical disc is disclosed, which employs, as a radiation-curable composition, an active energy ray-curable composition containing no inorganic substance such as silica particles and containing an oligomer component which is at least one of urethane (meth)acrylate and epoxy (meth)acrylate, a dioxolanyl group-containing (meth)acrylate, and other ethylenic unsaturated compound (see Patent Document 2).

Further, the present inventors previously filed an application for a patent relating to an optical disc employing a radiation-curable composition having a water absorption of at most 2 wt % (see Patent Document 3).

Furthermore, as an adhesive composition for an optical recording medium (optical disc), technique employing a photo-curing method is disclosed (see Patent Document 4).

Patent Document 1: JP-A-2005-36184
Patent Document 2: JP-A-2003-231725
Patent Document 3: JP-A-2006-161030
Patent Document 4: JP-A-2004-359779

DISCLOSURE OF THE INVENTION

Problems to be Solved by the Invention

The radiation-curable composition disclosed in Patent Document 1 has surface hardness and transparency, and also has excellent adhesion to a substrate even when the composition is used as a layer of a cured product having a thickness of at least a few ten μm at the time of forming a laminate on the substrate.

However, the present inventors have further conducted studies on such a radiation-curable composition and as a result, found that when the radiation-curable composition is used as a cover coat layer for protecting an information recording layer of an optical recording medium, if a metal layer is present on the surface being in contact with the cover coat layer, the metal layer may be corroded. As a result, it has been found that when the above radiation-curable composition is used for the optical recording medium, if the optical recording medium is left to stand for a long period of e.g. 200 hours or more at high temperature under high humidity, signal properties such as an error rate and a jitter value may be deteriorated depending upon the standing time.

Accordingly, various studies have been conducted to prevent corrosion of a metal layer.

For example, Patent Document 2 discloses that by using an active energy ray-curable composition, it is possible to obtain a cured product which has e.g. adhesion to a substrate, low shrinkage on curing and mechanical strength and in addition, which can prevent corrosion of a metal layer.

Further, Patent Document 3 discloses that with a radiation-curable composition, which has a water absorption of at most 2%, corrosion of a metal layer can be reduced.

However, none of the radiation-curable compositions can sufficiently prevent the corrosion or the deterioration of a metal layer, and in a case where such a composition is applied to an optical recording medium, there is a problem that the signal properties such as the error rate and the jitter value are likely to be deteriorated.

The present invention has been made in view of the above problems. That is, it is an object of the present invention to provide an optical recording medium of which mechanical properties and storage stability will not be impaired, and which will show little deterioration in signal properties even after being left to stand at high temperature under high humidity.

Means to Solve the Problems

The present inventors have conducted extensive studies on an optical recording medium capable of solving the above problems and as a result, have found that it is possible to provide an optical recording medium which can remarkably suppress deterioration of the recording properties. The present invention has been accomplished on the basis of this discovery.

That is, the present invention provides the following:

(1) An optical recording medium to perform recording/reading by means of blue laser, which has a value of 10 or less as obtained by "error rate after its environmental resistance test/error rate before its environmental resistance test" in error rates obtained before and after its environmental resistance test carried out by leaving the medium to stand for 500 hours at a temperature of 80° C. under a relative humidity of 80%.

(2) The optical recording medium according to the above (1), comprising at least a substrate, a recording/reading layer and a light transmitting layer, wherein the light transmitting layer contains sulfur atoms and chlorine atoms in an amount of at least 15 ppm and at most 100 ppm in total.

(3) The optical recording medium according to the above (1), wherein the light transmitting layer contains sulfur atoms and chlorine atoms in an amount of at least 19 ppm and at most 40 ppm in total.

(4) The optical recording medium according to the above (2) or (3), wherein the recording/reading layer comprises a dielectric layer, a recording layer and a reflective layer.

(5) The optical recording medium according to any one of the above (2) to (4), wherein the light transmitting layer comprises a cover coat layer and a hard coat layer.

(6) The optical recording medium according to any one of the above (2) to (4), wherein the light transmitting layer contains a compound having an epoxy group.

(7) The optical recording medium according to above (5), wherein the hard coat layer is formed from a hard coat agent (1) containing a silicone compound and/or a fluorine compound having an active energy ray-curable group at its terminal and containing no inorganic component, a hard coat agent (2) containing a polymer having active energy ray-curable groups and a silicone unit and/or an organic fluorine group unit, or a hard coat agent (3) containing a silicone compound and/or a fluorine compound having an active energy ray-curable group at its side chain.

(8) The optical recording medium according to the above (5) or (7), wherein the cover coat layer is formed from a radiation-curable composition.

(9) The optical recording medium according to the above (8), wherein the radiation-curable composition contains (A): a urethane (meth)acrylate compound, (B): an acrylate compound other than the urethane (meth)acrylate compound (A), (C): a compound having at least one epoxy group in its molecule and (D): a polymerization initiator.

(10) A method of recording/reading an optical recording medium, which comprises employing blue laser for recording/reading the optical recording medium as defined in any one of the above (1) to (9).

EFFECTS OF THE INVENTION

In the present invention, it is possible to provide an optical recording medium which can remarkably suppress deterioration of the recording properties, and such an optical recording medium is useful as a next generation high density optical recording medium, which employs blue laser for recording/reading.

EXPLANATION OF SYMBOLS

Figure 1:
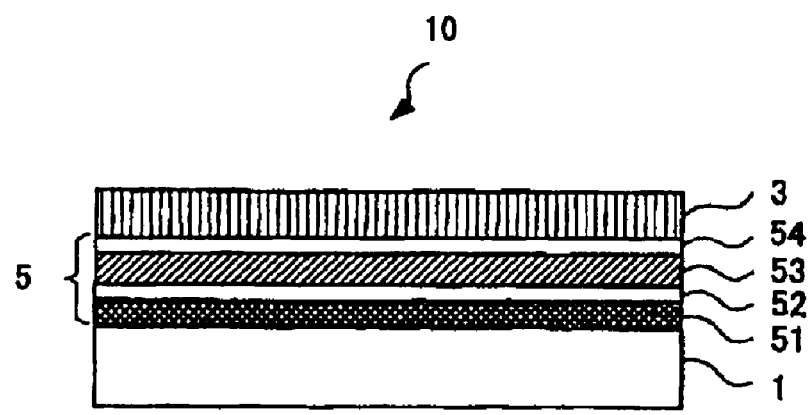
FIG. 1 is a cross-sectional view showing one embodiment of the optical recording medium of the present invention.

1: Substrate
3: Cover coat layer
5: Recording/reading layer
10: Optical recording medium
51: Reflective layer
52: Dielectric layer
53: Recording layer
54: Dielectric layer

BEST MODE FOR CARRYING OUT THE INVENTION

Now, the present invention will be described in detail. However, the present invention is by no means restricted to the following embodiments, and the present invention can be carried out in a variety of modification forms within the scope of the invention.

1. Optical Recording Medium

As a usual optical recording medium, a write once medium on which recording is possible only once and a rewritable medium on which recording and erasing are repeatedly carried out, may be mentioned. As the optical recording medium of the present invention, either a write once medium or a rewritable medium may be used, but particularly a write once medium is preferred. The reason is such that in the case of the write once medium, the initial reflectance of a reflective layer is high as compared with a rewritable medium, but on the other hand, the deterioration of the reflectance after the environmental resistance test and the deterioration of the error rate accompanying it tend to be remarkable, however, it is possible to remarkably suppress the deterioration of the error rate according to the effect of the present invention.

Further, as laser (hereinafter sometimes referred to as "recording/reading light") for performing recording/reading of the optical recording medium, blue laser having a wavelength of at least 350 nm and at most 450 nm is used. An optical recording medium using the blue laser for recording/reading will be referred to as a next generation high density optical recording medium in this specification.

The next generation high density optical recording medium is an optical recording medium having a cover coat layer formed on the surface having e.g. a dielectric layer, a recording layer and a reflective layer (hereinafter, such layers will generally be referred to as "recording/reading layer") on a substrate, which employs blue laser as recording/reading light.

Further, the above optical recording medium may have various layer structures depending upon its purpose. For example, in the case of the write once medium, the cover coat layer is preferably formed on the surface on which the recording/reading layer is formed. The recording/reading layer is usually constituted by providing a reflective layer containing a metal such as aluminum, silver or gold and a recording layer containing an organic coloring matter in this order on a substrate. Further, in the case of the rewritable optical recording medium, the recording/reading layer is usually constituted by providing a reflective layer containing a metal such as aluminum, silver or gold as a main component, a dielectric layer, a recording layer and a dielectric layer in this order on a substrate.

Here, the metal as a main component represents a metal contained in an amount of usually at least 60 wt %, preferably at least 70 wt %, more preferably at least 80 wt %, furthermore preferably at least 85 wt %, particularly preferably at least 90 wt % based on the total amount of all the metals. Further, the upper limit is preferably 99 wt %, more preferably 97 wt %, particularly preferably 94 wt %.

Further, the layer structure of the optical recording medium of the present invention is not limited to the structure as mentioned above, and optional layers may be laminated in an optional order within a range of not significantly impairing the effect of the present invention.

Now, the optical recording medium of the present invention will be described with reference to the layer structure of the rewritable medium, but it should be understood that the optical recording medium of the present invention is by no means restricted to the following contents. Further, the optical recording medium of the present invention is not limited to the rewritable optical recording medium, and even in the case of the write once optical recording medium, it is possible to apply the following contents so long as they are applicable.

FIG. 1 is a cross-sectional view explaining one embodiment of a recording/reading layer 5 in a rewritable optical recording medium 10. The recording/reading layer 5 comprises a reflective layer 51 formed from a metal material directly formed on a substrate 1, a recording layer 53 formed from a phase-change material, and two dielectric layers 52 and 54 provided to sandwich the recording layer 53.

A cover coat layer 3 formed from a cured product obtained by spin coating the radiation-curable composition for the optical recording medium of the present invention, followed by radiation-curing, is provided in contact with the recording/reading layer 5 and has a flat circular shape. The cover coat layer 3 is formed by a material capable of transmitting a laser beam to be used for recording and reading. The transmittance of the cover coat layer 3 is usually at least 80%, preferably at least 85%, more preferably at least 89% at a wavelength of light to be used for recording/reading. Within such a range, the loss by absorption of the recording/reading light can be minimized. Further, the transmittance is most preferably 100%, but it is usually at most 99% in view of performance of materials used.

It is preferred that such a cover coat layer 3 is adequately transparent to a laser beam at a wavelength in the vicinity of that to be used for recording/reading of the optical disk, and it has properties to protect the recording layer 53 formed on the substrate 1 from water and dust. In addition, the surface hardness of the cover coat layer 3 is preferably at least B by a pencil hardness test in accordance with JIS K5400. If the hardness is too small, the surface is likely to be damaged. Further, if the hardness is too large, the cured product is likely to be brittle, whereby cracking or delamination is likely to occur.

Further, it is preferred that the adhesion between the cover coat layer 3 and the recording/reading layer 5 is high. Further, the adhesion with time is preferably high, and the ratio of the area in which the cover coat layer 3 and the recording/reading layer 5 are adhered to each other after left in an environment at 80° C. under a relative humidity of 85% for 100 hours, or preferably for 200 hours, is preferably at least 50%, more preferably at least 80%, particularly preferably 100%, relative to the area of adhesion before leaving them as they are for a predetermined time.

The thickness of the cover coat layer 3 may optionally be selected so long as the effect of the present invention is not significantly impaired, and it is usually at least 10 μm, preferably at least 20 μm, more preferably at least 30 μm, furthermore preferably at least 70 μm, particularly preferably at least 85 μm, and usually at most 300 μm, preferably at most 130 μm, more preferably at most 115 μm. When the thickness is within such a range, it is possible to reduce influences by dust attached on the surface of the cover coat layer 3 or damages, and it is sufficient to protect the recording/reading layer 5 from e.g. outside moisture. Further, the cover coat layer 3 can readily be formed to have a uniform thickness by a common coating method employed in e.g. spin coating. It is preferred that the cover coat layer 3 is formed to have a uniform thickness within a range where it covers the recording/reading layer 5.

Here, a hard coat layer may further be formed on the above cover coat layer 3 though it is not shown in FIG. 1, and in such a case, the type of the hard coat layer is not particularly limited so long as the surface hardness is at least B, and one known as a hard coat layer in a conventional optical recording medium may be used. Further, in the present invention, the surface hardness of the hard coat layer is preferably at least B, more preferably at least HB, furthermore preferably at least F, most preferably at least H. Further, the surface hardness may be measured by the pencil hardness test in accordance with JIS K5400. Further, the hard coat layer has a light beam transmittance at a wavelength of 550 nm of usually at least 80%, preferably at least 85%, more preferably at least 88%. Further, the contact angle to water is at least 90°, more preferably at least 100°, whereby the optical recording medium has high stainproof properties. The contact angle to water can be measured by a known method using a contact angle meter or the like.

Further, the thickness of the hard coat layer may optionally be selected without significantly impairing the effect of the present invention, and the thickness is usually at least 0.5 μm, preferably at least 1 μm, more preferably at least 1.5 μm, and usually at most 5 μm, preferably at most 3 μm, more preferably at most 2 μm. If the hard coat layer is too thin, the surface hardness may be deteriorated, and if it is too thick, cracking may occur.

Further, it is preferred that the hard coat layer of the present invention has stainproof properties such as high contact angle to water. As a material for a hard coat layer having stainproof properties (hereinafter, sometimes referred to as "hard coat agent"), a known optional material may be used without significantly impairing the effect of the present invention. Among them, preferred is a radiation-curable composition containing a silicone compound and/or a fluorine compound as a stainproof properties-imparting agent, and at least one member selected from the group consisting of a multifunctional (meth)acrylate monomer, an epoxy group-containing compound, and an inorganic component such as inorganic nanoparticles. The stainproof properties-imparting agent may, for example, be specifically a silicone compound such as a polymer having a silicone skeleton such as an organopolysiloxane skeleton, a radiation-curable compound having a silicone skeleton and an acrylic group, or a silicone surfactant; or a fluorine compound such as a polymer containing fluorine atoms, a radiation-curable compound having a fluorine atom and an acrylic group, or a fluorinated surfactant. The stainproof properties-imparting agent may be used alone or two or more may be used in an optional ratio in optional combination.

However, in the case of a high density recording medium such as an optical recording medium employing blue laser, the medium is sensitive to stain such as fingerprints, dust or dirt since the laser spot diameter is small. Particularly, a stain containing an organic matter such as fingerprints, which is adhered to the surface of the medium on a side from which the laser beam enters, may have serious influences such as recording/reading errors by the laser in some cases, and the stain is hardly removed in some cases. Accordingly, the hard coat agent which can be used in the present invention is particularly preferably an active energy ray-curable hard coat agent containing a silicone compound and/or a fluorine compound as the stainproof properties-imparting agent, and among them, the above stainproof properties-imparting agent having active energy ray-curing properties is preferably contained. Further, the silicone compound as the above stainproof properties-imparting agent is preferably polysiloxane. As a preferred specific example of the hard coat agent, (1) a hard coat agent (1) containing a silicone compound and/or a fluorine compound having active energy ray-curable group at its terminal and containing no inorganic component, (2) a hard coat agent (2) containing a polymer having active energy ray-curable groups and a silicone unit and/or an organic fluorine group unit, and (3) a hard coat agent (3) containing a silicone compound and/or a fluorine compound having an active energy ray-curable group at its side chain, may be mentioned. Further, such a hard coat agent may be used alone or two or more may be used in an optional ratio in optional combination.

Now, the above hard coat agents (1) to (3) will be described in detail, but it should be understood that the hard coat agent is not limited to the following contents.

The hard coat agent (1) is not particularly limited so long as it contains a silicone compound and/or a fluorine compound containing an active energy ray-curable group at its terminal, and contains no inorganic component. Among them, the silicone compound is preferably polysiloxane. Further, the preferred amount of the respective components contained, may optionally be selected within a range of not significantly impairing the effect of the present invention, and it is preferred that usually at least 0.01 part by weight, and usually at most 10 parts by weight of the silicone compound and/or the fluorine compound having an active energy ray-curable group at its terminal is contained. Further, a (meth)acrylate composition containing usually at least 30 wt % of a (meth)acrylate having at least 3 (meth)acryloyl groups in one molecule, is preferably contained in an amount of usually at least 88 parts by weight, preferably at least 90 parts by weight, more preferably at least 95 parts by weight, and further, the upper limit is usually 99.8 parts by weight, preferably 99.6 parts by weight, more preferably 99 parts by weight. If the content of the (meth)acrylate composition in the hard coat agent (1) is too low, the mechanical strength of the hard coat layer may be deteriorated, and if it is too high, the stainproof properties may be deteriorated.

Further, the hard coat agent (1) preferably contains a photopolymerization initiator in an amount of usually at least 0.1 part by weight, preferably at least 0.3 part by weight, more preferably at least 0.5 part by weight, and further, the upper limit is usually 10 parts by weight, preferably 5 parts by weight, more preferably 3 parts by weight. If the amount of the photopolymerization initiator is too small, the curing property may be deteriorated, and if it is too large, the light transmittance may be deteriorated, or the thickness of the hard coat layer may be reduced during the environmental resistance test.

Further, as the case requires, in order to control the viscosity or the coating properties, an organic solvent in which such components are soluble may be blended. Of course, within a range of not significantly impairing the effect of the present invention, components other than the above components may be blended in an optional ratio in optional combination.

The silicone compound having an active energy ray-curable group at its terminal is not particularly limited so long as the effect of the present invention is not remarkably impaired, but preferred is a compound having an acryloyl group and/or a (meth)acryloyl group at one terminal or at both terminals. Among them, particularly preferred is polydimethylsiloxane having a molecular weight of usually at least 500, and usually at most 10,000 having (meth)acryloyl groups at both terminals. The silicone compound having an active energy ray-curable group at its terminal may be used alone or two or more may be used in an optional ratio in optional combination.

Further, as the fluorine compound having an active energy-ray group at its terminal, an optional compound may be used within a range of not significantly impairing the effect of the present invention. For example, a perfluoroalkyl compound, a perfluoroalkylene compound or a perfluoroalkylene polyether compound each having an acryloyl group and/or a (meth)acryloyl group at one terminal or at both terminals, may be mentioned. Such compounds may be used alone or two or more of them may be used in an optional ratio in optional combination.

Further, the (meth)acrylate composition containing usually at least 30 wt %, preferably at least 50 wt %, more preferably at least 70 wt % of a (meth)acrylate having at least 3 (meth)acryloyl groups in one molecule may contain a (meth)acrylate having one (meth)acryloyl group and/or a (meth)acrylate having two (meth)acryloyl groups in one molecule. Further, the upper limit of the content is not particularly present. If the content is too low, the surface hardness may decrease.

As the (meth)acrylate having at least three (meth)acryloyl groups in one molecule, an optional compound may be used within a range of not significantly impairing the effect of the present invention. For example, pentaerythritol triacrylate, pentaerythritol tetraacrylate, dipentaerythritol pentaacrylate, dipentaerythritol hexaacrylate, ditrimethylolpropane tetraacrylate, a polyester acrylate, a multifunctional urethane acrylate, a polyepoxy acrylate, or triethoxy acrylate having an isocyanurate ring (for example, ARONIX M315, M313 or the like manufactured by TOAGOSEI CO., LTD.) may be mentioned. Such compounds may be used alone or two or more may be used in an optional ratio in optional combination.

As the (meth)acrylate compound having one (meth)acryloyl group in one molecule, an optional compound may be used within a range of not significantly impairing the effect of the present invention. For example, an alkyl(meth)acrylate such as butyl methacrylate or stearyl acrylate; an alicyclic (meth)acrylate such as cyclohexyl acrylate or isobornyl methacrylate; or a hetero atom-containing cyclic structure-containing acrylate such as tetrahydrofurfuryl acrylate may be mentioned, and in addition, a (meth)acrylate having an aromatic ring, a (meth)acrylate having a hydroxy group, or a (meth)acrylate having a polyalkylene glycol chain or the like may also be preferably used. Such compounds may be used alone or two or more may be used in an optional ratio in optional combination.

As the (meth)acrylate compound having two (meth)acryloyl groups in one molecule, an optional compound may be used within a range of not significantly impairing the effect of the present invention. For example, a di(meth)acrylate of an aliphatic or alicyclic diol such as hexanediol diacrylate; a polyalkylene glycol di(meth)acrylate such as polyethylene glycol diacrylate; a polyester diacrylate, a polyurethane diacrylate; or a bifunctional epoxy acrylate is preferred. Such compounds may be used alone or two or more may be used in an optional ratio in optional combination.

As the photopolymerization initiator at the time of carrying out polymerization using active energy rays, an optional compound may be used within a range of not significantly impairing the effect of the present invention. Preferred is an alkylphenone type compound (α-hydroxyacetophenone type, α-aminoacetophenone type, benzyl ketal type), an acylphosphine oxide type compound, an oxime ester compound, an oxyphenyl acetate, a benzoin ether, a phenyl formate, a ketone, an amine compound or the like. Specifically preferred is benzoin methyl ether, benzoin ethyl ether, benzoin propyl ether, benzoin butyl ether, diethoxyacetophenone, benzyl dimethyl ketal, 2-hydroxy-2-methylpropiophenone, 1-hydroxycyclohexyl phenyl ketone, benzophenone, 2,4,6-trimethylbenzoin diphenylphosphine oxide, 2-methyl-[4-(methylthio)phenyl]-2-morpholino-1-propanone, 2-benzyl-2-dimethylamino-1-(4-morpholinophenyl)-butan-1-one, methyl benzoyl formate, Michler's ketone, isoamyl N,N-dimethylaminobenzoate, 2-chlorothioxanthone, 2,4-diethylthioxanthone, etc. Such compounds may be used alone or two or more may be used in an optional ratio in optional combination.

In the hard coat agent (1), in a case where a mixture is mixed with a solvent, as the solvent to be used, an optional compound may be used within a range of not significantly impairing the effect of the present invention. For example, an alcohol (such as ethanol, isopropyl alcohol or isobutyl alcohol), a ketone (acetone, methyl ethyl ketone or methyl isobutyl ketone), an alcohol having an alkoxy group (such as methoxy ethanol, ethylene glycol monoethyl ether or propylene glycol monomethyl ether), an ether (such as ethylene glycol dimethyl ether or diethylene glycol dimethyl ether), an ether ester (such as propylene glycol monomethyl ether acetate or 2-ethoxyethyl acetate), an aromatic hydrocarbon (such as toluene or xylene) or an ester (such as ethyl acetate or propyl acetate) may be mentioned as a preferred example, and it is preferred to suitably select one which is excellent in compatibility and/or uniform dispersibility with other components. Such compounds may be used alone or two or more may be used in an optional ratio in optional combination.

The hard coat agent (2) is not particularly limited so long as it contains a polymer having active energy ray-curable groups and a silicone unit and/or an organic fluorine group unit. Especially, the silicone compound is preferably polysiloxane. Further, the preferred amount of the respective components contained is optional within a range of not significantly impairing the effect of the present invention, but the polymer containing active energy ray-curable groups and a silicone unit and/or an organic fluorine group unit is contained in an amount of preferably usually at least 0.1 part by weight and usually at most 20 parts by weight, more preferably at least 1 part by weight and at most 10 parts by weight. Further, it is preferred that a (meth)acrylate composition containing a (meth)acrylate having at least 3 (meth)acryloyl groups in one molecule in an amount of usually at least 30 wt %, preferably at least 50 wt %, more preferably at least 70 wt %, furthermore preferably 90 wt %, is contained in an amount of usually at least 79.8 parts by weight, preferably at least 85 parts by weight, more preferably at least 90 parts by weight, and further the upper limit is usually 99.5 parts by weight, preferably 97 parts by weight, more preferably 93 parts by weight. If the content of the (meth)acrylate composition in the hard coat agent (2) is too low, the mechanical strength of the hard coat layer may be lowered, and if it is too high, the stainproof properties may be lowered.

Further, the hard coat agent (2) preferably contains a photopolymerization initiator in an amount of usually at least 0.1 part by weight, preferably at least 0.3 part by weight, more preferably at least 0.5 part by weight, and further the upper limit is usually 10 parts by weight, preferably 5 parts by weight, more preferably 3 parts by weight. If the amount of the photopolymerization initiator is too small, the curability may be insufficient, and if it is too large, the transmittance may be deteriorated, or the thickness of the hard coat layer may considerably reduced during the environmental resistance test.

Further, an organic-inorganic hybrid type (meth)acrylate may be added so that inorganic (oxide) fine particles such as silica are contained within a range not to exceed 50 wt % of the total amount of the (meth)acrylate composition. Further, as the case requires, an organic solvent in which such components are soluble may be added so as to adjust the viscosity, the coating properties and the like. Of course, components other than the above components may be mixed therewith in an optional ratio in optional combination, within a range of not considerably impairing the effect of the present invention.

The polymer containing active energy ray-curable groups and a silicone unit and/or an organic fluorine group unit is not particularly limited within a range of not considerably impairing the effect of the present invention. For example, it may be preferably a polymer obtainable by copolymerizing dimercaptosilicon and/or a perfluoroalkyl(meth)acrylate with an epoxy group-containing (meth)acrylate, and adding a carboxylic acid having a (meth)acryloyl group to epoxy groups of the copolymer. Further, such compounds may be used alone or two or more may be used in an optional ratio in optional combination.

The hard coat agent (3) is not particularly limited so long as it contains a silicone compound and/or a fluorine compound having an active energy ray-curable group in its side chain. Especially, the silicon compound is preferably polysiloxane. Further, the preferred amount of the respective components contained is optional within a range of not significantly impairing the effect of the present invention, but the silicone compound and/or the fluorine compound having an active energy ray-curable group in its side chain is contained in an amount of preferably usually at least 0.01 part by weight and usually at most 10 parts by weight, more preferably at least 0.1 part by weigh and at most 5 parts by weight. Further, a (meth)acrylate composition containing usually at least 30 wt % of a (meth)acrylate having at least 3 (meth)acryloyl groups in one molecule, is preferably contained in an amount of usually at least 88 parts by weight, preferably at least 90 parts by weight, more preferably at least 95 parts by weight, and further the upper limit is usually 99.8 parts by weight, preferably 99.6 parts by weight, more preferably 99 parts by weight. If the content of the (meth)acrylate composition in the hard coat agent (3) is too low, the mechanical strength of the hard coat layer may be deteriorated, and if it is too high, the stainproof properties may be deteriorated.

Further, the hard coat agent (3) preferably contains a photopolymerization initiator in an amount of usually at least 0.1 part by weight, preferably at least 0.3 part by weight, more preferably at least 0.5 part by weight, and further the upper limit is usually 10 parts by weight, preferably 5 parts by weight, more preferably 3 parts by weight. If the amount of the photopolymerization initiator is too small, the curability tends to be insufficient, and if it is too large, the transmittance tends to be deteriorated, or the thickness of the hard coat layer tends to be considerably reduced during the environmental resistance test.

Further, the organic-inorganic hybrid type (meth)acrylate may be added so that the inorganic (oxide) fine particles such as silica are contained within a range not to exceed 50 wt % of the total amount of the (meth)acrylate composition. Further, as the case requires, an organic solvent in which such components are soluble may be added so as to adjust the viscosity, the coating properties and the like. Of course, components other than the above components may be mixed therewith in an optional ratio in optional combination, within a range of not considerably impairing the effect of the present invention.

The compound containing the silicone compound and/or the fluorine compound having an active energy ray-curable group in its side chain, is not particularly limited within a range of not significantly impairing the effect of the present invention, and it may, for example, be poly(dimethylsiloxane/methyl(meth)acryloyloxyalkyl siloxane), poly(dimethylsiloxane/methyl (meth)acryloyl siloxane) or poly(dimethylsiloxane/methyl(meth)acryloyloxy alkyloxy siloxane) each having at least two (meth)acryloyl groups per molecule at its side chain; or polyperfluoroalkylene polyether or a (meth)acrylic acid modified product of a perfluoroalkylmercaptane terminal capped polyglycidyl methacrylate oligomer, each having at least two (meth)acryloyl groups per molecule at its side chain. Such a compound may be used alone or two or more may be used in an optional ratio in optional combination.

In the optical recording medium of the present invention, the light transmitting layer is usually constituted of a cover coat layer and a hard coat layer. It is preferred that the optical recording medium of the present invention comprises at least a substrate, a recording/reading layer and a light transmitting layer, wherein the above light transmitting layer contains sulfur atoms and chlorine atoms in an amount of preferably at least 15 ppm and at most 100 ppm in total. Further, the lower limit is more preferably 19 ppm. Further, the upper limit is usually 100 ppm, preferably 60 ppm, more preferably 40 ppm. If the content of the sulfur atoms and the chlorine atoms is too low, the adhesion to the respective layers is likely to be deteriorated, and if it is too high, a metal layer is likely to corrode. Further, when either sulfur atoms or chlorine atoms are contained, it is preferred that such atoms satisfy the above range by themselves.

The optical recording medium of the present invention is characterized in that the error rate is not deteriorated even when the light transmitting layer contains sulfur atoms and/or chlorine atoms. Usually, the sulfur atoms and/or the chlorine atoms in the light transmitting layer tend to cause the corrosion of the reflective layer, and therefore it has been desired to reduce amount. In the present invention, even when a large amount of the sulfur atoms and/or the chlorine atoms are contained, such an optical recording medium can be obtained that the corrosion of the metal layer is suppressed and the adhesion is also excellent, and the error rate will not be deteriorated.

The form of the chlorine atoms in the hard coat layer is optional within a range of not significantly impairing the effect of the present invention, but usually they are incorporated as e.g. a chloride salt such as sodium chloride, so-called organochlorine as chlorine bonded to a carbon atom in an organic compound. Such chlorine atoms may be supplied to the hard coat layer by an optional method, and for example, they may be contained in e.g. a raw material for the radiation-curable composition, a photopolymerization initiator or a (meth)acrylate, or may be mixed as an additive.

The form of the sulfur atoms in the hard coat layer is optional within a range of not significantly impairing the effect of the present invention, but usually they are incorporated as e.g. a sulfonate, a sulfate or a sulfide. Such sulfur atoms may be supplied to the hard coat layer by an optional method, and for example, they may be contained in e.g. a raw material for a radiation-curable composition, a photopolymerization initiator or a (meth)acrylate, or may be mixed as an additive.

By incorporating the sulfur atoms and/or the chlorine atoms, it is possible to obtain advantages such that the mechanical strength and the adhesion are improved. If the content of the sulfur atoms and/or the chlorine atoms is too low, the adhesion between the hard coat layer and the cover coat layer tends to be deteriorated, and if it is too high, the metal layer tends to corrode.

In the optical recording medium of the present invention, the error rate after the environmental resistance test is preferably at most $1 \times 10^{-4}$, more preferably at most $3 \times 10^{-6}$, particularly preferably at most $1 \times 10^{-6}$. Further, the lower limit thereof is ideally 0. If the error rate is too large, the recording reliability of the optical recording medium is lowered.

The environmental resistance test of the present invention can be carried out in accordance with the method as mentioned below. That is, in a constant temperature and humidity chamber set at a temperature of 80° C. under a relative humidity of 80%, the optical recording medium is left to stand for 500 hours. At that time, it is preferred that the temperature and humidity raising and decreasing rate is moderate, and for example, the temperature is raised or decreased at 10° C./hr, and the humidity is raised or decreased at 10%/hr. It is possible to use an optional constant temperature and humidity chamber, and it is also possible to optionally set various conditions so long as the error rate can be measured under desired conditions.

Further, the error rate means a rate of the number of error data in a certain amount of data. For example, in a case where one error is observed, that is, record cannot normally be restored, in 1,000,000 data, the error rate is such that:

Error rate=one error/1,000,000=$1\times10^{-6}$

The optical recording medium of the present invention has a value of usually at most 10, preferably at most 8, more preferably at most 6, particularly preferably at most 5 as obtained by "error rate after its environmental resistance test/error rate before its environmental resistance test" in error rates before and after the above environmental resistance test. For example, when the error rate is $1\times10^{-6}$ before the environmental resistance test, the above preferred range is satisfied when the error rate after the test is not higher than $1\times10^{-6}$, that is, when the error rate is at most $1\times10^{-6}$.

The measurement of the error rate of the present invention may be carried out by using an optional device so long as it is possible to measure the error rate under desired conditions, and for example, it is possible to carry out the measurement by measuring SER (symbol error rate) using an SER measuring device: ODU-1000, manufactured by Pulstec Industrial Co., Ltd.

The SER measurement is based on how many error bites are present in 10,000 data in "LDC block" composed of 75,352 bytes, i.e. in 10,000 block data. Further, when the calculation is made on condition that at least 40 bytes (totally at most 600 bytes) of errors, called "burst", are excluded, there is a case where the error rate is called RSER (random symbol error rate).

It is preferred that the optical recording medium of the present invention satisfies the above suitable conditions. That is, the optical recording medium of the present invention has a value of 10 or less as obtained by "error rate after its environmental resistance test/error rate before its environmental resistance test" in error rates obtained before and after its environmental resistance test carried out by leaving the medium to stand at a temperature of 80° C. under a relative humidity of 80% for 500 hours, and the recording/reading is carried out by blue laser.

There are various means to achieve the above-mentioned reduction of the error rate, and among them, as a suitable means, the above-mentioned means to incorporate sulfur atoms and/or chlorine atoms in the light transmitting layer may be mentioned. In addition, as a suitable means, the following may be mentioned. However, it should be understood that the following are merely specific examples, and the means to achieve the reduction of the error rate is not limited to the following.

For example, it is possible to incorporate a compound having an epoxy group in the cover coat layer and/or the hard coat layer. The mechanism of why the error rate is not reduced by incorporation is not clearly understood, but supposedly, the epoxy group has a function to capture a halogen compound, and the oxidation reaction or the dissolution reaction mediated by the halogen ions is suppressed. Further, the content of the compound having an epoxy group is preferably within the range as mentioned below.

Further, the cover coat layer may be one having a low water absorption. In the oxidation or dissolution, it is considered that at least the material transfer by means of water as a medium plays an important role, and therefore, it is assumed that by reducing the water absorption, the inclusion of the water as a medium is prevented, and as a result, the oxidation/dissolution reaction can be suppressed. Here, the phrase "low water absorption" means a water content of usually at most 3 wt %, preferably at most 2 wt %, more preferably at most 1 wt %, to the cover coat layer.

Further, it is also possible to increase the crosslinking density of the cover coat layer. The reason of why the error rate is not reduced is not clearly understood, but as mentioned above, it is considered that the material transfer by means of water as a medium plays an important role in the oxidation/dissolution. Accordingly, it is assumed that by increasing the crosslinking density, the transfer of the water and the material can be suppressed, and as a result, the oxidation/dissolution reaction can be suppressed.

Further, in accordance with the same studies, the moisture permeability of the cover coat layer may be lowered. The preferred range of the moisture permeability is usually at most 100 g/m²·24 h, preferably at most 80 g/m²·24 h, more preferably at most 50 g/m²·24 h.

Further, the amount of an acid component (e.g. an acrylic acid or an inorganic acid, especially a dibasic acid) contained in the cover coat layer may also be reduced. The acid component has a function to let e.g. a metal dissolve, and therefore it is assumed that the oxidation/dissolution reaction can be suppressed by reducing the content. The specific preferred range of the content is usually at most 3 μmol/g, preferably at most 2 μmol/g, more preferably at most 1 μmol/g.

Further, the amount of the sodium atoms contained in the cover coat layer may be reduced. The mechanism of how the sodium atoms directly relate to the oxidation or the dissolution reaction is not clearly understood, but it is considered that since the sodium atoms readily ionize and extremely readily transfer, they intervene in and support the transfer/reaction of other elements or materials. Accordingly, by reducing the amount of the sodium atoms, it is possible to suppress the interference suppress the oxidation/dissolution reaction. The specific preferred range of the content of the sodium atoms in the cover coat layer is usually at most 30 ppm, preferably at most 20 ppm, more preferably at most 10 ppm.

Further, a filler may be incorporated in the cover coat layer. The filler does not directly suppress the oxidation/dissolution reaction of the material, but a bond such as a hydrogen bond formed on the interface between the surface of the filler and the matrix prevents the material transfer, and as a result, it is possible to suppress the oxidation/dissolution reaction. The specific preferred range of the amount of the filler incorporated in the cover coat layer is usually at least 0.1 wt %, preferably at least 0.5 wt %, more preferably at least 1 wt %. Further, the upper limit is usually 50 wt %, preferably 10 wt %, more preferably 2 wt %.

Further, a mercapto compound and/or a phosphorus compound may be incorporated in the cover coat layer. The mercapto compound and/or the phosphorus compound improves the adhesion to a base material. Accordingly, moisture or ions are concentrated at the interface between the cover coat layer and the base material, whereby the formation of a local cell and subsequent corrosion such as pitting corrosion can be suppressed. The specific preferred range of the amount of the mercapto compound and/or the phosphor compound incorporated in the cover coat layer is usually at least 0.1 wt %, preferably at least 0.2 wt %, more preferably at least 0.5 wt %. Further, the upper limit is usually 5 wt %, preferably 3 wt %, more preferably 1 wt %.

Further, it is also useful to lower the content of hydroxy groups in the cover coat layer. Due to extremely high hydrophilicity of the hydroxy group, an ionic material readily transfers, whereby the corrosion or the dissolution reaction easily proceeds. Accordingly, by reducing the amount of the hydroxy group, it is possible to prevent the corrosion or the dissolution reaction. The preferred range of the content of the hydroxy group in the cover coat layer is usually at most $1 \times 10^3$ mol/g, preferably at most $2 \times 10^{-4}$ mol/g, more preferably at most $1 \times 10^{-4}$ mol/g.

Further, at the time of producing the optical recording medium of the present invention, especially when a (meth)acrylate compound containing a hydroxy group is used as a raw material, it is difficult to remove (meth)acrylic acid used as a raw material in the step of producing the (meth)acrylate compound, and therefore the raw material for the production of the optical recording medium contains a large amount of the (meth)acrylate compound containing a hydroxy group and unreacted (meth)acrylic acid in the same system in many cases. Accordingly, it is undesirable to use, as the raw material, the (meth)acrylate containing a hydroxy group, having a large amount of (meth)acrylic acid residue, since the amount of the above "acid component" is increased thereby to accelerate the dissolution. Accordingly, the optical recording medium of the present invention is produced by using a (meth)acrylate compound containing a hydroxy group, having a purity as high as possible.

Further, it is also useful to improve the curing properties of the composition for a cover coat layer so that the unreacted monomers hardly remain therein. If the unreacted monomer remains, the crosslinking density becomes low. Further, the unreacted monomer easily vaporizes in a high-temperature and high-humidity environment, and voids are formed after the vaporization. Water or water-soluble ions readily transfer through the voids, whereby the corrosion or the dissolution reaction proceeds, and therefore it is useful to reduce such voids. It is preferred that the hardness of the cover coat layer is within the range as mentioned below.

Further, by conducting the same study, it is useful to reduce the amount of a polymerization initiator to be added thereby to suppress vaporization of unreacted monomer components in the environmental resistance test and the resulting formation of voids due to the unreacted monomer. It is preferred that the amount of the polymerization initiator to be added is within the range as mentioned below.

Further, a number of urethane bonds and/or amide bonds in the cover coat layer may be increased, whereby it is possible to block passing of moisture or corrosive ions by the increase of the formation of intermolecular hydrogen bonds due to the increase of such bonds. A specific number of the urethane bonds and/or amide bonds is usually at least $1 \times 10^{-4}$ mol/g, preferably at least $5 \times 10^{-4}$ mol/g, more preferably at least $8 \times 10^{-4}$ mol/g. Further, the upper limit is usually $3 \times 10^{-3}$ mol/g, preferably $2 \times 10^{-3}$ mol/g, more preferably $1.5 \times 10^{-3}$ mol/g.

Further, by providing crystallinity to a skeleton of a compound as a constituent component in the cover coat layer, intramolecular transfer and intermolecular transfer are controlled, whereby it is possible to block the passing of water or corrosive ions.

It is also useful to reduce the viscosity of the composition for a cover coat layer thereby to suppress formation of coating defects in the step of forming the cover coat layer. When the coating defects themselves are voids, such sites are likely to be a route for a transfer of water or water-soluble ions. Further, if the coating defects are concentration unevenness, e.g. water or electrons are likely to be concentrated in such sites, and material transfer or reaction tends to be initiated from the sites as a base point. Accordingly, the reduction of the coating defects implies that such a base point does not form. A specific viscosity of the composition for a cover coat layer is usually at least 0.1 Pa·s, preferably at least 0.5 Pa·s, more preferably at least 1 Pa·s. Further, the upper limit is usually 5 Pa·s, preferably 3 Pa·s, more preferably 2 Pa·s.

Further, the heat resistance of the cover coat layer may be improved (that is, the glass transition temperature may be increased). By increasing the glass transition temperature, the molecular motion of the compound constituting the cover coat layer is reduced, whereby a passing route for the water or corrosive ions are hardly formed. The glass transition temperature is usually at least −5° C., preferably at least 20° C., more preferably at least 40° C. Further, the upper limit is usually 200° C., preferably 100° C., more preferably 60° C.

Further, the optical recording medium of the present invention may have a back coat layer formed on the opposite side of the recording/reading layer as observed from the substrate.

The back coat layer to be used in the present invention may optionally be formed within a range of not significantly impairing the effect of the present invention, but the elastic modulus at 25° C. is preferably within a prescribed range, and specifically, the upper limit is 2,000 MPa, preferably 1,500 MPa. Further, the lower limit is not restricted, but is preferably higher than the elastic modulus of the cover coat layer. If the elastic modulus of the above back coat layer is too high, the deformation of the optical recording medium relative to the temperature change may be too large. A measuring method of the above elastic modulus is the same as a measuring method of the elastic modulus of the cover coat layer, and may be carried out in accordance with JIS K7127.

Further, the thickness of the above back coat layer is not particularly limited within a range of not significantly impairing the effect of the present invention, but is usually at least 3 μm, preferably at least 5 μm, more preferably at least 10 μm, and further the upper limit is usually 50 μm, preferably 30 μm, more preferably 20 μm, furthermore preferably 15 μm. If the thickness of the back coat layer is too small, substantially no effect of suppressing the deformation of the optical recording medium due to the formation of the back coat layer will be achieved, and if the thickness is too large, the optical recording media are easily contacted with one another when piled and stored, whereby the appearance will be impaired, and errors are likely to occur during reading a record.

A material to be used for the formation of the back coat layer is not particularly limited within a range of not significantly impairing the effect of the present invention. Specifically, it is usually possible to use a material known as a material for the back coat layer, and for example, it is possible to use the same material as for the above-mentioned cover coat layer, but it is preferred to selectively use one which can give the above elastic modulus. As such a material, it is particularly preferred to use a radiation-curable composition.

Now, explanation is made with reference to a case of using the radiation-curable composition, but the radiation-curable composition is not limited to the following contents. Further, the raw material for the back coat layer is not limited to the radiation-curable composition as exemplified below.

As a specific example of the radiation-curable composition, a resin composition containing, as a main component, a compound having an unsaturated bond at the terminal or in the side chain of its molecule such as an alkyl(meth)acrylate, a urethane (meth)acrylate or a polyester (meth)acrylate may be mentioned. Among the above main components, from the viewpoint of shrinkage on curing or capability to form the back coat layer without a solvent, the urethane (meth)acrylate is preferred. As a specific example of the urethane (meth)acrylate, (A) an urethane (meth)acrylate compound (details will be described hereinafter) to be used for forming a cover coat layer may be mentioned. They may be used alone, or two or more may be used in an optional ratio in optional combination.

Further, to the above resin composition, it is possible to optionally blend an optional compound within a range of not significantly impairing the effect of the present invention. Among them, it is preferred to blend a monofunctional (meth)acrylate. More specifically, the monofunctional (meth)acrylate may, for example, be a (meth)acrylamide such as N,N-dimethyl (meth)acrylamide; a hydroxyalkyl(meth)acrylate such as hydroxyethyl(meth)acrylate, hydroxypropyl (meth)acrylate or hydroxybutyl(meth)acrylate; or an alicyclic (meth)acrylate such as (meth)acryloyl morpholine, tetrahydrofurfuryl(meth)acrylate, isobornyl(meth)acrylate, cyclohexyl(meth)acrylate, cyclopentane (meth)acrylate, dicyclopentadienyl(meth)acrylate or a (meth)acrylate having a tricyclodecane skeleton. Such compounds may be used alone or two or more may be used in an optional ratio in optional combination.

Among the above, with a view to increasing the elastic modulus of the back coat layer, a monofunctional acrylate containing an alicyclic structure such as isobornyl(meth)acrylate, cyclopentane (meth)acrylate or dicyclopentadienyl (meth)acrylate is preferred.

Further, the content of the urethane (meth)acrylate in the radiation-curable composition to be used for forming the back coat layer is preferably at least 1 wt %, more preferably at least 10 wt %, furthermore preferably at least 30 wt %, and preferably at most 70 wt %, more preferably at most 60 wt %, per 100 wt % in total of the content of the urethane (meth)acrylate and the monofunctional (meth)acrylate. If the content of the urethane (meth)acrylate is too low, the mechanical strength may be deteriorated, and if it is too high, the viscosity is remarkably increased, and the workability may thereby be deteriorated.

Further, in the above radiation-curable composition for forming the back coat layer, it is possible to use a multifunctional (meth)acrylate within a range not to lower the elastic modulus. The multifunctional (meth)acrylate may, for example, be the same as a multifunctional (meth)acrylate (details will be mentioned hereinafter) to be used for forming a cover coat layer. They may be used alone or two or more may be used in an optional ratio in optional combination.

Further, in the above radiation-curable composition for forming the back coat layer, it is possible to incorporate other optional components within a range of not significantly impairing the effect of the present invention. For example, a polymerization initiator, an auxiliary component etc. to initiate the polymerization reaction which proceeds by radiation (such as active energy rays, ultraviolet rays or electron beams) may be incorporated. Specifically, for example, a polymerization initiator or an auxiliary component (details will be mentioned hereinafter) to be used in the radiation-curable composition to be used for forming a cover coat layer may be mentioned. They may be used alone or two or more may be used in an optional ratio in optional combination.

Further, the application method of the radiation-curable composition at the time of forming the above back coat layer is not particularly limited, and a common application method such as spin coating method may be employed.

Further, the radiation to be used for curing the above radiation-curable composition for forming the hard coat layer is also not particularly limited, and for example, the same radiation (details will be mentioned hereinafter) to be used at the time of forming the cover coat layer can be employed.

On the optical recording medium of the present invention, a thin film such as an inorganic layer may be formed on the surface of the substrate opposite to the surface having the recording/reading layer formed, by means of e.g. sputtering, for the purpose of suppressing deformation of the optical recording medium due to the temperature change, but it is preferred that no thin film is formed from the viewpoint of the cost.

The optical recording medium obtained as mentioned above may be used for an optional use by an optional method, and it may be used as a single plate or two or more may be bonded. Further, as the case requires, a hub may be attached to the optical recording medium, and the medium may be assembled in a cartridge.

2. Radiation-Curable Composition for Cover Coat Layer

The radiation-curable composition for a cover coat layer of the present invention may employ optional materials within a range of not significantly impairing the effect of the present invention. Among them, a radiation-curable composition containing a urethane (meth)acrylate compound (A) is preferred, and further it preferably contains an acrylate compound other than the urethane (meth)acrylate compound (A) (hereinafter sometimes referred to as "another acrylate compound (B)").

(2-1. Urethane (Meth)Acrylate Compound (A))

The urethane (meth)acrylate compound (A) may be obtained by an optional method within a range of not significantly impairing the effect of the present invention, but it is usually obtained by reacting a polyisocyanate compound, a hydroxy group-containing compound and a hydroxy group-containing (meth)acrylate compound. As the urethane (meth)acrylate compound (A), a urethane acrylate compound is preferred, whereby the surface curing properties are excellent and tack is less likely to remain.

(a. Polyisocyanate Compound)

The polyisocyanate compound is a polyisocyanate compound having two or more isocyanate groups in its molecule. By use of this compound, it is possible to obtain an advantage that the mechanical properties are excellent.

As the polyisocyanate compound, it is possible to use an optional compound within a range of not significantly impairing the effect of the present invention, and tetramethylene diisocyanate, hexamethylene diisocyanate, trimethylhexamethylene diisocyanate, bis(isocyanatomethyl)cyclohexane, cyclohexane diisocyanate, bis(isocyanatocyclohexyl)methane, isophorone diisocyanate, tolylene diisocyanate, xylylene diisocyanate, diphenylmethane diisocyanate, m-phenylene diisocyanate or naphthalene diisocyanate may, for example, be mentioned.

Among them, in view of the favorable hue of an obtainable urethane oligomer, preferred is bis(isocyanatomethyl)cyclohexane, cyclohexane diisocyanate, bis(isocyanatocyclohexyl)methane or isophorone diisocyanate. The polyisocyanate compound may be used alone or two or more may be used in an optional ratio in optional combination.

Further, the number average molecular weight of the polyisocyanate compound is usually at least 100, preferably at least 150, and further usually at most 1,000, preferably at most 500. When the molecular weight is within such a range, it is possible to obtain an advantage that a balance between the strength and the elastic modulus becomes good.

(b. Hydroxy Group-Containing Compound)

As the hydroxy group-containing compound, it is possible to use an optional compound within a range of not significantly impairing the effect of the present invention. Among them, preferred is a polyol containing at least two hydroxy groups, and as a specific example, an alkylene polyol such as ethylene glycol, 1,2-propanediol, 1,3-propanediol, 2-methyl-1,3-propanediol, 1,3-butanediol, 1,4-butanediol, 1,5-pentanediol, 2-methyl-1,5-pentanediol, neopentyl glycol, 3-methyl-1,5-pentanediol, 2,3,5-trimethyl-1,5-pentanediol, 1,6-hexanediol, 2-ethyl-1,6-hexanediol, 2,2,4-trimethyl-1,6-hexanediol, 1,8-octanediol, trimethylolpropane, pentaerythritol, sorbitol, mannitol, glycerin, 1,2-dimethylolcyclohexane, 1,3-dimethylolcyclohexane or 1,4-dimethylolcyclohexane may be mentioned. The hydroxy group-containing compound may be used alone, or two or more may be used in an optional ratio in an optional combination.

Among them, the above-mentioned polyol is preferably a polyether polyol compound having an ether bond for forming a multimer; a polyester polyol compound having an ester bond obtained by the reaction with a polybasic acid or an ester bond obtained by ring-opening polymerization of a cyclic ester; or a polycarbonate polyol compound having a carbonate bond obtained by the reaction with a carbonate.

As a specific example of the polyether polyol, in addition to the multimer of the above polyol; a polytetramethylene glycol as a ring-opening polymerized product of a cyclic ether such as tetrahydrofuran; or an adduct of an alkylene oxide such as ethylene oxide, propylene oxide, 1,2-butylene oxide, 1,3-butylene oxide, 2,3-butylene oxide, tetrahydrofuran or epichlorohydrin to the above polyol.

The polyester polyol compound may, for example, be specifically a reaction product of the above polyol with a polybasic acid such as maleic acid, fumaric acid, adipic acid, sebacic acid or phthalic acid; or polycaprolactone as a ring-opening polymerized product of a cyclic ester such as caprolactone.

The polycarbonate polyol compound may, for example, be specifically a reaction product of the above polyol with an alkylene carbonate such as ethylene carbonate, 1,2-propylene carbonate or 1,2-butylene carbonate, a diaryl carbonate such as diphenyl carbonate, 4-methyldiphenyl carbonate, 4-ethyldiphenyl carbonate, 4-propyldiphenyl carbonate, 4,4'-dimethyldiphenyl carbonate, 2-tolyl-4-tolyl carbonate, 4,4'-diethyldiphenyl carbonate, 4,4'-dipropyldiphenyl carbonate, phenyltoluoyl carbonate, bischlorophenyl carbonate, phenylchlorophenyl carbonate, phenylnaphthyl carbonate or dinaphthyl carbonate, or a dialkyl carbonate such as dimethyl carbonate, diethyl carbonate, di-n-propyl carbonate, diisopropyl carbonate, di-n-butyl carbonate, diisobutyl carbonate, di-t-butyl carbonate, di-n-amyl carbonate or diisoamyl carbonate.

Among such polyols, a polyether polyol compound is preferred, and further a polyalkylene glycol is preferred. Further, among polyalkylene glycols, polytetramethylene glycol is particularly preferred.

Such polyols may be used alone, or two or more may be used in an optional ratio in optional combination.

Further, usually at least a part of the polyols, preferably at least 15 mol % in total of the polyols, more preferably at least 30 mol % in total of the polyols has a number average molecular weight of preferably at least 200, more preferably at least 400, and further the upper limit is preferably 1,500, more preferably 800. When the number average molecular weight of the polyols is within such a range, the water absorbance or moisture absorbance as a monomer having an urethane bond becomes low, whereby it is possible to obtain an advantage that the corrosion of the recording layer when the polyols are used for e.g. an optical recording medium as a cured product can be suppressed.

Accordingly, as the hydroxy group-containing compound, preferred is a polyalkylene glycol having a number average molecular weight of at most 800, particularly preferred is a polytetramethylene glycol having a number average molecular weight of at most 800.

(c. Hydroxy Group-Containing (Meth)Acrylate Compound)

The hydroxy group-containing (meth)acrylate compound is a compound having both hydroxy group and (meth)acryloyl group. It is possible to use an optional compound within a range of not significantly impairing the effect of the present invention, and it may, for example, be hydroxyethyl (meth)acrylate, hydroxypropyl(meth)acrylate, hydroxybutyl(meth)acrylate, an addition reaction product of a glycidyl ether compound with (meth)acrylic acid, or a mono(meth)acrylate of a glycol compound. Such a hydroxy group-containing (meth)acrylate compound may be used alone or two or more may be used in an optional ratio in optional combination.

The number average molecular weight of the hydroxy group-containing (meth)acrylate compound is usually at least 40, preferably at least 80, and further usually at most 800, preferably at most 400. If the molecular weight is too small, the shrinkage on curing may increase, and if the molecular weight is too large, the viscosity may increase.

(d. Method for Producing Urethane (Meth)Acrylate Compound (A))

By subjecting a polyisocyanate compound, a hydroxy group-containing compound and a hydroxy group-containing (meth)acrylate compound to addition reaction, the urethane (meth)acrylate compound (A) containing a (meth)acryloyl group can be produced. At that time, it is preferred that such raw materials to be used are charged so that an isocyanate group and a hydroxy group are stoichiometrically equal in amount. Especially, by using a diol as the hydroxy group-containing compound, there is an advantage that the resulting urethane (meth)acrylate compound (A) has a more increased adhesion to a cured product or surface hardness.

Further, at the time of producing the urethane (meth)acrylate compound (A), the amount of the hydroxy group-containing (meth)acrylate compound to be used is usually at least 20 wt %, preferably at least 40 wt %, and further usually at most 80 wt %, preferably at most 60 wt % based on the total amount of all the compounds including the above hydroxy group-containing compound and the above hydroxy group-containing (meth)acrylate compound. The molecular weight of the resulting urethane (meth)acrylate compound (A) can be controlled depending upon the proportion. If the amount to be used is too small, the shrinkage on curing may increase, and if the amount to be used is too large, the viscosity may significantly increase.

The addition reaction of the polyisocyanate compound, the hydroxy group-containing compound and the hydroxy group-containing (meth)acrylate compound may be carried out by any known method so long as the desired urethane (meth) acrylate compound can be produced. For example, a mixture of the polyisocyanate compound, the hydroxy group-containing compound and the hydroxy group-containing (meth)acrylate compound as raw materials and a catalyst for the addition reaction to be used as the case requires (hereinafter sometimes referred to as "raw material mixture") are subjected to reaction at usually 40° C. or higher, preferably 50° C. or higher, and further usually at 90° C. or lower and preferably 75° C. or lower. If the temperature is too low, the desired urethane (meth)acrylate compound (A) may not be produced, and if the temperature is too high, the raw materials may be decomposed.

The reaction time is optional so long as the desired urethane (meth)acrylate compound can be produced, but is usually at least 30 minutes, preferably at least one hour, more preferably at least 3 hours, and further the upper limit is usually 48 hours, preferably 24 hours, more preferably 18 hours. If the reaction time is too short, the desired urethane (meth)acrylate compound may not be produced, and if the reaction time is too long, coloring or gelation may occur.

Further, the heating may be carried out in such a manner that the above raw material mixture is heated to a prescribed temperature, or that the respective raw materials and the catalyst to be used as the case requires are heated to a prescribed temperature separately or in the form of a mixture of two or more raw materials, and the heated raw materials and catalyst to be used as the case requires are mixed. At that time, e.g. a method, conditions or an apparatus for the heating may optionally be determined within a range of not significantly impairing the effect of the present invention.

The method of the mixing is optional within a range of not significantly impairing the effect of the present invention, but it is especially preferred to dropwise add the mixture of the hydroxy group-containing (meth)acrylate compound and the addition reaction catalyst in the presence of the polyisocyanate compound.

The addition reaction catalyst is optional so long that the desired urethane (meth)acrylate compound can be produced, and for example, dibutyltin laurate, dibutyltin dioctoate, dioctyltin dilaurate or dioctyltin dioctoate is preferred. They may be used alone or two or more may be used in an optional ratio in optional combination.

In production of the urethane (meth)acrylate compound (A), other components may be contained in addition to the above-mentioned raw materials within a range of not significantly impairing the effect of the present invention. Further, conditions other than the above may optionally be determined within a range of not significantly impairing the effect of the present invention.

(e. Structure of Urethane (Meth)Acrylate Compound (A))

The urethane (meth)acrylate compound (A) is preferably a material having high transparency. As such a compound having high transparency, it is possible to use an optional compound within a range of not significantly impairing the effect of the present invention, and for example, preferred is a compound having no aromatic ring. A radiation-curable composition having an aromatic ring and its cured product may be colored, or even if they are initially not colored, they may be colored or the coloring may be deepened (so-called yellowing) during storage. The reason is considered to be an irreversible change of the structure of a double bond moiety forming the aromatic ring by energy beams. By the urethane (meth)acrylate compound (A) having a structure having no aromatic ring, the hue will not be deteriorated, and the light beam transmittance will not decrease, whereby it is especially suitable for applications to e.g. optoelectronics where it is required to be transparent and colorless.

The urethane (meth)acrylate compound (A) having no aromatic ring can be produced by addition reaction of a polyisocyanate compound having no aromatic ring, a hydroxy group-containing compound having no aromatic ring and a hydroxy group-containing (meth)acrylate compound having no aromatic ring.

As a specific example of the polyisocyanate compound having no aromatic ring, bis(isocyanatomethyl)cyclohexane, cyclohexane diisocyanate, bis(isocyanatocyclohexyl)methane or isophorone diisocyanate may be mentioned. They may be used alone or two or more may be used in an optional ratio in optional combination.

As a specific example of the hydroxy group-containing compound having no aromatic ring, an alkylene polyol, an alkylene polyester polyol or an alkylene carbonate polyol may be mentioned. They may be used alone or two or more may be used in an optional ratio in optional combination.

As a specific example of the hydroxy group-containing (meth)acrylate compound having no aromatic ring, a hydroxylalkyl(meth)acrylate may be mentioned. They may be used alone or two or more may be used in an optional ratio in optional combination.

The weight average molecular weight of the urethane (meth)acrylate compound (A) obtainable by reacting the above raw materials is usually at least 1,000, preferably at least 1,500, and further usually at most 10,000, preferably at most 5,000. When the weight average molecular weight is within such a range, the balance between the viscosity and the mechanical properties becomes good.

Further, the content of the urethane (meth)acrylate compound (A) is preferably at least 25 wt %, more preferably at least 30 wt % in the radiation-curable composition for a cover coat layer. Further, the upper limit is preferably 95 wt %, more preferably 90 wt %. If the content is too low, the moldability or the mechanical strength at the time of forming a cured product may be deteriorated or cracks may occur. If the content is too high, the surface hardness of the cured product may be deteriorated.

(2-2. Acrylate Compound (B) Other than Urethane (Meth) Acrylate Compound (A) (Other Acrylate Compound (B))

As such an other acrylate compound (B), any known acrylate compound other than the above urethane (meth)acrylate compound (A) can be used within a range of not significantly impairing the effect of the present invention. As a specific example, a monofunctional (meth)acrylate compound or a multifunctional (meth)acrylate compound may be mentioned. Among them, the monofunctional (meth)acrylate compound and the multifunctional (meth)acrylate compound are preferred from the viewpoint that the surface curing properties are excellent and no tack remains.

As a specific example of the monofunctional (meth)acrylate compound, a (meth)acrylamide such as N,N-dimethyl (meth)acrylamide; a hydroxy(meth)acrylate such as hydroxyethyl (meth)acrylate, hydroxypropyl(meth)acrylate or hydroxybutyl(meth)acrylate; or an alicyclic (meth)acrylate such as (meth)acryloyl morpholine, tetrahydrofurfuryl (meth)acrylate, isobornyl (meth)acrylate, cyclohexyl(meth) acrylate or a (meth)acrylate having a tricyclodecane skeleton may be mentioned.

Among them, an alicyclic (meth)acrylate is preferred, and more preferred is highly hydrophobic tetrahydrofurfuryl (meth)acrylate, isobornyl(meth)acrylate, cyclohexyl(meth) acrylate or a (meth)acrylate having a tricyclodecane skeleton.

The multifunctional (meth)acrylate compound may be an aliphatic poly(meth)acrylate, an alicyclic poly(meth)acrylate or an aromatic poly(meth)acrylate.

As a specific example of the multifunctional (meth)acrylate compound, polyethylene glycol di(meth)acrylate, 1,2-polypropylene glycol di(meth)acrylate, 1,3-polypropylene glycol di(meth)acrylate, polytetramethylene glycol di(meth) acrylate, 1,2-polybutylene glycol di(meth)acrylate or polyisobutylene glycol di(meth)acrylate; a (meth)acrylate having a polyether skeleton, such as a di(meth)acrylate of an alkylene oxide adduct of e.g. ethylene oxide, propylene oxide or butylene oxide to a bisphenol such as bisphenol A, bisphenol F or bisphenol S, a di(meth)acrylate of a hydrogenated derivative of a bisphenol such as bisphenol A, bisphenol F or bisphenol S, or a di(meth)acrylate of a block or random copolymer of a polyether polyol compound with another compound; or an indefinite multifunctional (meth)acrylate such as a bifunctional (meth)acrylate such as hexanediol di(meth)acrylate, nonanediol di(meth)acrylate, decanediol di(meth)acrylate, 2,2-bis[4-(meth)acryloyloxyphenyl]propane, 2,2-bis[4-(2-(meth)acryloyloxyethoxy)phenyl]propane, bis(hydroxymethyl)tricyclo[5.2.1.0$^{2,6}$]decane=dimethacrylate, p-bis[β-(meth)acryloyloxyethylthio]xylylene or 4,4'-bis[β-(meth) acryloyloxyethylthio]diphenylsulfone, a trifunctional (meth) acrylate such as trimethylolpropane tris(meth)acrylate, glycerol tris(meth)acrylate or pentaerythritol tris(meth)acrylate, a tetrafunctional (meth)acrylate such as pentaerythritol tetrakis(meth)acrylate, or a pentafunctional or higher functional (meth)acrylate such as dipentaerythritol hexa(meth) acrylate, may be mentioned.

Among them, in view of controllability of the crosslink formation reaction, preferred is the above bifunctional (meth) acrylate. As a specific example of the bifunctional (meth) acrylate, preferred is an aliphatic poly(meth)acrylate or an alicyclic poly(meth)acrylate, more preferred is hexanediol di(meth)acrylate, nonanediol di(meth)acrylate, bis(hydroxymethyl)tricyclo[5.2.1.0$^{2,6}$]decane=di(meth)acrylate.

Further, for the purpose of e.g. improving the heat resistance or the surface hardness of a crosslinked structure of a cured product, a trilyfunctional or higher functional (meth) acrylate may preferably be used. As a specific example, the above exemplified trimethylolpropane tris(meth)acrylate, pentaerythritol tris(meth)acrylate, dipentaerythritol hexa(meth)acrylate or a trifunctional (meth)acrylate having an isocyanurate skeleton may, for example, be mentioned.

The number average molecular weight of such an other acrylate compound (B) is optional within a range of not significantly impairing the effect of the present invention, and usually at least 50, preferably at least 100, and further usually at most 1,000, preferably at most 500. When the molecular weight is within such a range, it is possible to obtain an advantage that the balance between the viscosity and the shrinkage becomes good.

Further, the content of such an other acrylate compound (B) is usually at least 10 wt %, preferably at least 15 wt % in the radiation-curable composition for a cover coat layer. Further, the upper limit is usually 70 wt %, preferably 50 wt %. If the content of such an other acrylate compound (B) is too low, the viscosity of the radiation-curable composition for a cover coat layer may be high, and if it is too high, the mechanical properties as a cured product may be deteriorated.

Further, such an other acrylate compound (B) may be used alone or two or more may be used in an optional ratio in optional combination, but as such an other acrylate compound (B), it is preferred that at least one monofunctional (meth)acrylate compound and at least one multifunctional (meth)acrylate compound are contained.

The content of such an other acrylate compound (B) is usually preferably at least 80 wt % based on the total amount of the urethane (meth)acrylate compound (A) and such an other acrylate compound (B). The content is more preferably at least 90 wt %, furthermore preferably at least 95 wt %, particularly preferably at least 98 wt %. If the content of such an other acrylate compound (B) is low, the curing rate may be lowered, the surface curing properties may be deteriorated, and the tack is likely to remain.

(2-3. Polymerization Initiator (D))

The radiation-curable composition for a cover coat layer of the present invention preferably contains a polymerization initiator (D) to initiate the polymerization reaction which proceeds by radiation (such as active energy rays, ultraviolet rays or electron beams). In a case where radiations are active energy rays or ultraviolet rays, it is particularly preferred to contain the polymerization initiator (D). As the polymerization initiator (D), a radical generator which is a compound having properties to generate radicals by light is commonly used, and any known radical generator can be used within a range of not significantly impairing the effects of the present invention.

As a specific example of the radical generator, benzophenone, 2,4,6-trimethylbenzophenone, 4,4-bis(diethylamino) benzophenone, 4-phenylbenzophenone, methyl o-benzoyl benzoate, thioxanthone, diethylthioxanthone, isopropylthioxanthone, chlorothioxanthone, 2-ethylanthraquinone, t-butylanthraquinone, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether, methyl benzoyl formate, 2-methyl-1-[4-(methylthio) phenyl]-2-morpholinopropan-1-one, 2,6-dimethylbenzoyl diphenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)

phenylphosphine oxide or 2-hydroxy-1-[4-[4-(2-hydroxy-2-methyl-propionyl)-benzyl]-phenyl]-2-methyl-propan-1-one may be mentioned.

Among them, preferred is 1-hydroxycyclohexyl phenyl ketone, 2,4,6-trimethylbenzoyl diphenylphosphine oxide or 2-hydroxy-1-[4-[4-(2-hydroxy-2-methyl-propionyl)-benzyl]-phenyl]-2-methyl-propan-1-one.

Further, in order to increase the curing rate and sufficiently increase the crosslink density, among the above radical generators, particularly preferred is benzophenone, 2-hydroxy-2-methyl-1-phenylpropan-1-one, 1-hydroxycyclohexyl phenyl ketone, 2-hydroxy-1-[4-[4-(2-hydroxy-2-methyl-propionyl)-benzyl]-phenyl]-2-methyl-propan-1-one, or 2,4,6-trimethylbenzoyl diphenylphosphine oxide.

In a case where the cured product of the radiation-curable composition for a cover coat layer of the present invention is to be used for e.g. an optical recording medium using a laser at a wavelength of from 380 to 450 nm as the light source, it is preferred to select the type and the amount of use of the radical generator so that the laser beam necessary for reading is sufficiently transmitted through the light transmitting layer. In such a case, it is particularly preferred to use a short wavelength sensitive radical generator so that the obtainable light transmitting layer hardly absorbs a laser beam.

Among the above radical generators, such a short wavelength sensitive radical generator may, for example, be benzophenone, 2,4,6-trimethylbenzophenone, 4-phenylbenzophenone, methyl o-benzoyl benzoate, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether or methyl benzoyl formate. Among them, particularly preferred is one having a hydroxy group such as 1-hydroxycyclohexyl phenyl ketone.

Such radical generators may be used alone or two or more may be used in an optional ratio in optional combination.

Further, the amount of use of the radical generator is usually at least 0.1 part by weight, preferably at least 1 part by weight, more preferably at least 2 parts by weight, and is usually at most 10 parts by weight, preferably at most 9 parts by weight, more preferably at most 7 parts by weight, per 100 parts by weight in total of the urethane (meth)acrylate compound (A) and the other (meth)acrylate compound (B). If the amount of use is too small, the radiation-curable composition for a cover coat layer tends to be not sufficiently cured. And on the contrary, if it is too large, the polymerization reaction will suddenly proceed, thus leading to an increase in the optical distortion and in addition, the hue may be deteriorated.

Together with such a radical generator, an optional component may be used in combination within a range of not significantly impairing the effect of the present invention. For example, a known sensitizer such as methyl 4-dimethylaminobenzoate, ethyl 4-dimethylaminobenzoate, amyl 4-dimethylaminobenzoate or 4-dimethylaminoacetophenone may be used in combination. Such sensitizers may be used alone or two or more may be used in an optional ratio in optional combination.

When a benzophenone type polymerization initiator is used as the polymerization initiator (D), the benzophenone type polymerization initiator is used in an amount of usually at least 0.5 part by weight, per 100 parts by weight in total of the urethane (meth)acrylate (A) and the other acrylate compound (B), and further the upper limit is preferably 2 parts by weight, more preferably 1 part by weight. If the amount of the benzophenone type polymerization initiator is large, the volatile component in the cured product tends to increase, whereby the thickness in high temperature and high humidity environment may decrease in some cases.

In a case where the polymerization reaction is initiated by electron beams as radiation, the above radical generator may be used, but it is preferred not to use the radical generator or another initiator, since sufficient curing is achieved even without use of the polymerization initiator (D).

Further, the polymerization initiator (D) other than the radical generator may, for example, be an oxidizing agent.

Such a polymerization initiator (D) may be used alone or two or more may be used in an optional ratio in optional combination.

The polymerization initiator (D) may contain impurities such as chlorine atoms, sulfur atoms, phosphorus atoms or sodium atoms in some cases, and the content of such impurities is preferably low. The content of each atom is preferably at most 200 ppm, more preferably at most 100 ppm. If the content of the impurities is too high, a desired cured product of the radiation-curable composition may not be obtained.

(2-4. Epoxy Group-Containing Compound)

As a means to obtain the optical recording medium of the present invention with a low error rate, it is preferred to incorporate a compound having at least one epoxy group in the radiation-curable composition for a cover coat layer. The epoxy group may be contained in any form by any method. For example, a method of mixing the compound (C) containing at least one epoxy group in its molecule with a radiation-curable composition for a cover coat layer or a method of mixing the urethane (meth)acrylate compound (A) containing an epoxy group with a radiation-curable composition for a cover coat layer may be mentioned.

(a. Compound (C) Containing at Least One Epoxy Group in its Molecule)

The compound (C) containing at least one epoxy group in its molecule according to the present invention is not particularly limited so long as it is a compound having an epoxy group. As a specific example, a glycidyl ether type epoxy resin obtainable by glycidylation of a polyhydric phenol such as bisphenol A, bisphenol F, bisphenol S, or novolac of phenol or an alkyl phenol, or a polyhydric alcohol such as a glycol or trimethylolpropane; a glycidyl ester type epoxy resin obtainable by glycidylation of a polycarboxylic acid such as adipic acid or phthalic acid; a glycidyl amine type epoxy resin obtainable by glycidylation of a polyamine such as diaminodiphenylmethane, diaminodiphenylsulfone or isocyanurate; a glycidyl amino glycidyl ether type epoxy resin obtainable by glycidylation of e.g. aminophenol or an aminoalkylphenol; or an alicyclic epoxide such as 3,4-epoxy-6-methylcyclohexyl-3,4-epoxy-6-methylcyclohexylcarboxylate or 3,4-epoxycyclohexylmethyl-3,4-epoxycyclohexylcarboxylate may be mentioned.

A part or all of the hydrogen atoms in such a compound may be substituted with a halogen atom such as a chlorine atom or a bromine atom, a polyalkylene oxide such as (poly) ethylene oxide may be added to the compound, and a compound having an aromatic ring may be hydrogenated. Further, it is preferred that such a compound is sufficiently purified to reduce impurities, and is not colored.

Among them, a glycidyl ether type epoxy resin as a glycidylated product of bisphenol A or bisphenol F and its hydrogenated compound are preferred since they are readily available and hardly decrease the physical properties of the radiation-curable composition for a cover coat layer. Among them, a bisphenol A type epoxy resin or a hydrogenated bisphenol A type epoxy resin is particularly preferred.

In addition, as the compound (C) containing at least one epoxy group in its molecule, it is also preferred to use a silica having an epoxy group introduced onto the surface.

Now, a process for producing the silica having an epoxy group introduced onto the surface will be explained as a specific example. However, the following is mere one embodiment of the production process, and the process of introducing the epoxy group to the silica is not limited to the following and an optional process may be employed.

In an alcohol solvent, an alkoxy group in a silicate oligomer is hydrolyzed by using e.g. an acid catalyst to synthesize silicon oxide nanoparticles, and an epoxy group-containing trimethoxysilane compound is reacted on the surface of the resulting silicon oxide nanoparticles, thereby to obtain silica particles having their surface modified with an epoxy group.

As the above alcohol solvent, e.g. methanol, ethanol or propanol is preferred, and among them, methanol is preferred since the balance between hydrophilicity and hydrophobicity is good. Such an alcohol solvent may be used alone or two or more may be used in an optional ratio in optional combination. The amount of the alcohol solvent to be used is usually at least 100 wt %, preferably at least 200 wt %, and further usually at most 900 wt %, preferably at most 400 wt %, to the solid content. If the amount of the alcohol solvent to be used is too small, gelation may occur, and if it is too large, the reaction may not sufficiently proceed.

Further, the acid catalyst is preferably e.g. an inorganic acid, an organic acid or an acid chelate compound, an acid chelate compound is more preferred since pH is proper, and among them, acetylacetone aluminum is particularly preferred. Such an acid catalyst may be used alone or two or more may be used in an optional ratio in optional combination. The amount of the acid catalyst to be used is usually at least 0.05 wt %, preferably at least 0.1 wt %, and usually at most 1 wt %, preferably at most 0.5 wt %, to the total amount of the solid content and the solvent. If the amount of the acid catalyst to be used is too small, the reaction may not proceed sufficiently, and if it is too large, gelation may occur.

The reaction temperature for the hydrolysis is usually at least 20° C., preferably at least 40° C., and usually at most 90° C., preferably at most 80° C. If the reaction temperature is too low, the reaction rate may be slow, and if it is too high, gelation tends to occur. Further, the reaction time is usually at least 30 minutes, preferably at least 90 minutes, and usually at most 48 hours, preferably at most 24 hours. If the reaction time is too short, the reaction may not proceed sufficiently, and if it is too long, gelation tends to occur.

The reaction of the epoxy group-containing trimethoxysilane compound with the surface of the silicon oxide nanoparticles is carried out at a temperature of usually at least 20° C., preferably at least 40° C., and usually at most 90° C., preferably at most 80° C. If the reaction temperature is too low, the reaction may not proceed sufficiently, and if it is too high, gelation tends to occur. The reaction time is usually at least 30 minutes, preferably at least 90 minutes, and usually at most 48 hours, preferably at most 24 hours. If the reaction time is too short, the reaction may not proceed sufficiently, and if it is too long, gelation tends to occur.

Such a compound (C) containing at least one epoxy group in its molecule may be used alone or two or more may be used in an optional ratio in optional combination.

(b. Urethane (Meth)Acrylate Compound (A) Containing an Epoxy Group)

The urethane (meth)acrylate compound (A) may directly contain an epoxy group. Specifically, it is possible to introduce an epoxy group to all of the compounds exemplified as the urethane (meth)acrylate compound (A).

As a process for producing the urethane (meth)acrylate compound (A) containing an epoxy group, an optional process may be employed within a range of not significantly impairing the effect of the present invention. As one of the specific examples, a process of reacting the urethane (meth)acrylate compound (A), a silicate oligomer and an epoxy group-containing trimethoxysilane compound will be explained.

As the silicate oligomer and the epoxy group-containing trimethoxysilane compound, the same ones as explained in the above-mentioned (a. COMPOUND (C) CONTAINING AT LEAST ONE EPOXY GROUP IN ITS MOLECULE) may be used. Further, the reaction order of the urethane (meth)acrylate compound (A), the silicate oligomer and the epoxy group-containing trimethoxysilane compound is optional within a range of not significantly impairing the effect of the present invention, but usually, these compounds are mixed and reacted in a single step.

Now, such a process will be explained in further detail, but as mentioned above, it should be understood that the following is mere one embodiment and the production process is not limited to the following.

First of all, a polyisocyanate compound and a polyol compound containing a triol are reacted with each other to synthesize a urethane prepolymer having a triol compound bonded to its terminal. At that time, it is preferred that the polyol compound other than the triol is charged prior to the triol, so that it is reacted with an isocyanate group in the isocyanate compound in advance. The reaction is carried out at usually at least 40° C., preferably at least 60° C., and usually at most 80° C., preferably at most 70° C. If the reaction temperature is too low, the reaction may proceed slowly, and if it is too high, heat generation may be intense. Further, the reaction time is usually at least 60 minutes, preferably at least 120 minutes, and usually at most 6 hours, preferably at most 4 hours. If the reaction time is too short, the reaction may not proceed sufficiently, and if it is too long, the coloration may occur due to heat deterioration.

Then, the obtained urethane prepolymer, the polyisocyanate compound and an isocyanate group-containing trimethoxysilane compound (x) are reacted to obtain a prepolymer having a trimethoxysilane side chain. The reaction is carried out at usually at least 40° C., preferably at least 60° C., and further usually at most 80° C., preferably at most 70° C. If the reaction temperature is too low, the reaction may proceed slowly, and if it is too high, the heat generation may be intense. Further, the reaction time is usually at least 60 minutes, preferably at least 120 minutes, and usually at most 6 hours, preferably at most 4 hours. If the reaction time is too short, the reaction may not proceed sufficiently, and if it is too long, the coloration may occur due to heat deterioration.

The resulting prepolymer is reacted with a (meth)acryloyl compound having a hydroxy group to obtain a urethane (meth)acrylate having a trimethoxysilane side chain. The reaction is carried out usually at a temperature of at least 40° C., preferably at least 60° C., and usually at most 75° C., preferably at most 70° C. If the reaction temperature is too low, the reaction may not sufficiently proceed, and if it is too high, gelation may occur. Further, the reaction time is usually at least 2 hours, preferably at least 4 hours, and usually at most 24 hours, preferably at most 12 hours. If the reaction time is too short, the reaction may not proceed sufficiently, and if it is too long, the coloration may occur due to heat deterioration.

The obtained urethane (meth)acrylate is dissolved in an alcohol solvent, and a silicate oligomer and an epoxy group-containing trimethoxysilane compound (y) are reacted in the same manner as in the above process for producing a silica having an epoxy group introduced onto the surface, whereby a methoxy group of the isocyanate group-containing trimethoxysilane compound (x), an alkoxy group of the silicate oligomer and a methoxy group of the epoxy group-containing trimethoxysilane compound (y) are bonded by a methanol removal reaction to obtain the urethane (meth)acrylate compound (A) having an epoxy group introduced.

(c. Physical Properties of Epoxy Group-Containing Compound)

A number average molecular weight of the epoxy group-containing compound is preferably at most 1,000, more preferably at most 700, furthermore preferably at most 500, and the lower limit is not limited, but is usually 100. If the molecular weight is too large, the viscosity may increase and the viscosity of the radiation-curable composition for a cover coat layer may be too high.

The epoxy group-containing compound is preferably in a form of a liquid at room temperature from the viewpoint of excellent workability. That is, the melting point is usually at most 25° C., preferably at most 15° C., more preferably at most 5° C., and the lower limit is not limited, but is usually −50° C.

The amount of the epoxy groups in the epoxy group-containing compound is usually at least 90, and the upper limit is usually 500, preferably 300, more preferably 200, as represented by an epoxy equivalent which represents a molecular weight per epoxy group in the compound. If the epoxy equivalent is too large (that is, the amount of the epoxy groups in the compound is too small), the amount of the epoxy group-containing compound necessary for imparting a sufficient effect will be too large, whereby the mechanical strength may be deteriorated.

The content of the epoxy group-containing compound to the radiation-curable composition for a cover coat layer of the present invention is usually at least 0.1 wt %, preferably at least 0.3 wt %, more preferably at least 0.5 wt %, and usually at most 10 wt %, preferably at most 5 wt %, more preferably at most 3 wt %. If the content is too low, the error rate tends to be deteriorated, and if it is too high, the volume fraction of the composition which is not cured by radiation will be too large, whereby the mechanical strength may be deteriorated.

Further, the content of the epoxy group-containing compound to the radiation-curable composition for a cover coat layer of the present invention means a total amount of all the compounds containing an epoxy group (in a case where the entire or part of each of the urethane (meth)acrylate compound (A), the other acrylate compound (B) and the polymerization initiator (D) contains an epoxy group, such a compound containing an epoxy group, and the compound (C) containing at least one epoxy group in its molecule) to the total amount of compounds contained in the radiation-curable composition for a cover coat layer of the present invention.

Further, the content of the epoxy groups in the radiation-curable composition for a cover coat layer of the present invention is usually at least $1 \times 10^{-6}$ mol/g, preferably at least $1 \times 10^{-5}$ mol/g, furthermore preferably at least $2 \times 10^{-5}$ mol/g, and usually at most $1 \times 10^{-3}$ mol/g, preferably at most $5 \times 10^{-4}$ mol/g, furthermore preferably at most $2 \times 10^{-4}$ mol/g. If the content is too low, the effect of suppressing corrosion may be insufficient, and if it is too high, the storage stability may be deteriorated.

(d. Mechanism of how an Epoxy Group has an Effect on Corrosion)

By incorporating an epoxy group into the radiation-curable composition for a cover coat layer, it is possible to obtain the effect of the present invention, but the reason is not clearly understood. However, according to the assumption of the present inventors, it is assumed that the corrosion is suppressed in such a mechanism that the adhesion of the radiation-curable composition for a cover coat layer to the substrate is improved by the epoxy group, whereby concentration water or water-soluble ions on the interface between the radiation-curable composition and the substrate is prevented, and a corrosive material such as an inorganic chloride is trapped by the epoxy group.

The radiation-curable composition for a cover coat layer of the present invention may contain an acid component within a range of not significantly impairing the effect of the present invention. However, the content of the acid component is at most $1.0 \times 10^{-4}$ eq/g, more preferably at most $1.0 \times 10^{-5}$ eq/g in the radiation-curable composition for a cover coat layer. If the amount of the acid component is too large, a metal layer may easily be corroded. The type of the acid component which may be contained is not particularly limited, but it is preferred that no acid component is contained. As the acid component, an inorganic acid such as hydrochloric acid or sulfuric acid, or an organic acid such as formic acid, acetic acid, acrylic acid, benzoic acid, succinic acid or oxalic acid may be mentioned. In a case where such an acid component is contained, the error rate is likely to be deteriorated, and in some cases, the reflective layer may be corroded and dissolve.

The radiation-curable composition for a cover coat layer of the present invention may contain a basic component within a range of not significantly impairing the effect of the present invention. However, the content of the basic component is at most $1.0 \times 10^{-4}$ eq/g, more preferably at most $1.0 \times 10^{-5}$ eq/g in the radiation-curable composition for a cover coat layer. If the amount of the basic component is too large, a substrate comprising a resin may be dissolved. The type of the basic component which may be contained is not particularly limited, but the basic component which is preferably not contained may, for example, be sodium hydroxide, potassium hydroxide, calcium hydroxide or ammonia.

The surface hardness of the cured product of the radiation-curable composition for a cover coat layer of the present invention is usually at least 6B, preferably at least 4B, more preferably at least B, particularly preferably at least HB by a pencil hardness test in accordance with JIS K5400.

3. Advantage of the Radiation-Curable Composition for a Cover Coat Layer of the Present Invention According to the cured product of the radiation-curable composition for a cover coat layer of the present invention, it is possible to achieve an effect of preventing corrosion of a metal layer of the optical recording medium without impairing the mechanical properties and the storage stability.

4. Method of Recording/Reading the Optical Recording Medium of the Present Invention The method of recording/reading the optical recording medium of the present invention is characterized in that the recording/reading of the optical recording medium of the present invention is carried out by employing blue laser. As a light source for the blue laser, it is possible to employ a well-known light source such as laser diode so long as the wavelength is at least 350 nm and at most 450 nm.

EXAMPLES

Now, the present invention will be described in further detail with reference to Examples. However, the present invention is by no means restricted to the following Examples within a range not to depart from the scope of the present invention.

(Preparation of Urethane Acrylate Composition Fluid A)

Into a four-necked flask, 66.7 g of isophorone diisocyanate was put, heated at from 70 to 80° C. in an oil bath, and quietly stirred until the temperature became constant. After the temperature became constant, 4.5 g of 1,4-butanediol was added thereto, and further, 63.9 g of polytetramethylene ether glycol ("PTMG650", manufactured by Mitsubishi Chemical Corporation) was dropwise added thereto from a dropping funnel, followed by stirring for 2 hours while the temperature was maintained at 80° C. Then, the temperature was decreased to 70° C., then a mixture comprising 43.6 g of 2-hydroxyethyl acrylate, 0.06 g of methoquinone and 0.04 g of dibutyltin dioctoate was dropwise added thereto from a dropping funnel, and after the dropping was completed, the temperature was increased to 80° C. and stirring was carried out for 10 hours at the same temperature to prepare a urethane acrylate oligomer having a polyether polyol skeleton. To the resultant, 36.3 g of isobornyl acrylate and 24.2 g of dicyclopentadienyl dimethanol diacrylate ("DCPA", manufactured by Shin-Nakamura Chemical Co., Ltd.) were added thereto to lower the viscosity thereby to prepare the urethane acrylate composition fluid A. (Preparation of urethane acrylate composition fluid B)

Into a four-necked flask, 66.7 g of isophorone diisocyanate was put, heated at from 70 to 80° C. in an oil bath, and quietly stirred until the temperature became constant. After the temperature became constant, 4.5 g of 1,4-butanediol was added thereto, and further, a mixture comprising 70.0 g of polyester polyol ("Kuraray polyol P1090" manufactured by Kuraray Co., Ltd.) and 15.0 g of polyester polyol ("Kuraray polyol P-590" manufactured by Kuraray Co., Ltd.) was dropwise added thereto from a dropping funnel, followed by stirring for 2 hours while the temperature was maintained at 80° C. Then, the temperature was decreased to 70° C., then a mixture comprising 43.5 g of 2-hydroxyethyl acrylate, 0.06 g of methoquinone and 0.04 g of dibutyltin dioctoate was dropwise added thereto from a dropping funnel, and after the dropping was completed, the temperature was increased to 80° C. and stirring was carried out for 10 hours at the temperature to prepare a urethane acrylate oligomer having a polyether polyol skeleton. To the resultant, 40.0 g of isobornyl acrylate and 26.6 g of dicyclopentadienyl dimethanol diacrylate ("DCPA", manufactured by Shin-Nakamura Chemical Co., Ltd.) were added thereto to lower the viscosity thereby to prepare the urethane acrylate composition fluid B.

Example 1

85 g of the above obtained urethane acrylate composition fluid A, 10 g of tetrahydrofurfuryl acrylate, 5 g of 1,6-hexanediol diacrylate (manufactured by Kyoeisha Chemical Co., Ltd.) and 0.5 g of a bisphenol A type epoxy resin (828US; manufactured by Japan Epoxy Resins Co., Ltd.) were stirred and mixed at room temperature for one hour, then 5 g of 1-hydroxycyclohexyl phenyl ketone as a photopolymerization initiator was added thereto, followed by stirring at room temperature for 3 hours to prepare a radiation-curable composition.
(Measurement of Content of Chlorine Atoms and Sulfur Atoms)

The content of chlorine atoms and sulfur atoms in the radiation-curable composition was quantified by means of combustion and absorption-ion chromatography.
(Preparation of Optical Recording Medium)

On the surface of a resin substrate made of polycarbonate having a diameter of 120 mm and a thickness of 1.1 mm, an Al—Nd alloy (Al content: 73 wt %) reflective layer with a thickness of 100 nm, a ZnS—$SiO_2$ dielectric layer with a thickness of 25 nm, an Sn—Nb—N recording layer with a thickness of 15 nm and a ZnS—$SiO_2$ dielectric layer with a thickness of 30 nm were formed in this order by sputtering to obtain a recording/reading layer. To the surface of the dielectric layer as the outermost layer of the recording/reading layer, the radiation-curable composition for a cover coat layer was applied by a spin coater so that the thickness would be 100 μm and cured by applying ultraviolet rays with an irradiation amount of 100 mJ/$cm^2$ at a wavelength of 365 nm by a high-pressure mercury lamp (manufactured by HARISON TOSHIBA LIGHTING CORPORATION, TOSCURE 752) to form a cover coat layer. The ultraviolet ray irradiation amount was measured by a UV meter (manufactured by USHIO INC., UIT-250).

Such an optical recording medium was subjected to a recording reliability test as shown below to evaluate the error rate before the environmental resistance test.
(Recording Reliability Test)

By employing an SER (symbol error rate) measuring apparatus ODU-1000 manufactured by Pulstec Industrial Co., Ltd., the random SER was measured under the following measuring conditions.

Laser recording wavelength: 405 nm
Scanning condition: Constant line velocity of 9.83 m/s (Constant Line Velocity=CLV system)
Signal generator: MSG (Multi Signal Generator)
Object to be measured: Continuous 40,000 blocks started from an optional site on the optical recording medium Then, the above optical recording medium was left at rest for 500 hours in a constant temperature and humidity chamber set at a temperature of 80° C. under a relative humidity of 80%, and then taken out, and the same operation as in the above recording reliability test was carried out to evaluate the error rate after the environmental resistance test.
(Surface Curing Properties)

Onto a glass plate of 10 cm×10 cm×3 cm thickness, a radiation-curable composition film with a thickness of 100 μm was formed by a spin coater, and ultraviolet rays with an intensity of 300 mJ/$cm^2$ was applied thereon from the height of 15 cm by a high-pressure mercury lamp, whereupon the presence or absence of tack remained on the surface was evaluated. That is, the evaluation was carried out in such a manner that three points on the coated surface were lightly contacted by a forefinger wearing a rubber glove, and observation whether the trace of the rubber glove remains or not was carried out.

Traces were observed at three points: x
Trace(s) were observed at one or two points: Δ
No trace remains: ○

Example 2

The same operation as in Example 1 was carried out except that 2.0 g of a bisphenol A type epoxy resin (828US; manufactured by Japan Epoxy Resins Co., Ltd.) was mixed instead of 0.5 g of the bisphenol A type epoxy resin (828US; manufactured by Japan Epoxy Resins Co., Ltd.).

Example 3

The same operation as in Example 1 was carried out except that 0.5 g of a bisphenol F type epoxy resin (807; manufactured by Japan Epoxy Resins Co., Ltd.) was mixed instead of 0.5 g of the bisphenol A type epoxy resin (828US; manufactured by Japan Epoxy Resins Co., Ltd.).

Example 4

The same operation as in Example 1 was carried out except that the urethane acrylate composition fluid B was employed instead of the urethane acrylate composition fluid A.

Comparative Example 1

The same operation as in Example 1 was carried out except that the bisphenol A type epoxy resin (828US; manufactured by Japan Epoxy Resins Co., Ltd.) was not used.

Comparative Example 2

The same operation as in Example 1 was carried out except that 20 g of a bisphenol A type epoxy resin (828US; manufactured by Japan Epoxy Resins Co., Ltd.) was mixed instead of 0.5 g of the bisphenol A type epoxy resin (828US; manufactured by Japan Epoxy Resins Co., Ltd.).

Examples 1 to 4 and Comparative Examples 1 and 2 are summarized and shown in Table 1.

Further, in Table 1, regarding the items of types of the epoxy resin, "Bis A" represents that the bisphenol A type epoxy resin was used, and "Bis F" represents that the bisphenol F type epoxy resin was used.

Further, regarding the item of the urethane, "A" represents that the urethane acrylate composition fluid A was used, and "B" represents that the urethane acrylate composition fluid B was used.

TABLE 1

| | Epoxy resin as a raw material | | | | | | Chlorine | Sulfur content | |
| --- | --- | --- | --- | --- | --- | --- | --- | --- | --- |
| | Type | Content (mol %) | Urethane | SER (A) before test | SER (B) after test | (B)/(A) | content in a cover coat layer | in a cover coat layer | Curing properties |
| Ex. 1 | Bis A | $2.6 \times 10^{-5}$ | A | $5 \times 10^{-6}$ | $1 \times 10^{-5}$ | 2 | 15 | 4 | ○ |
| Ex. 2 | Bis A | $1.1 \times 10^{-4}$ | A | $5 \times 10^{-6}$ | $2 \times 10^{-5}$ | 4 | 29 | 4 | ○ |
| Ex. 3 | Bis F | $2.9 \times 10^{-5}$ | A | $5 \times 10^{-6}$ | $1 \times 10^{-5}$ | 2 | 35 | 4 | ○ |
| Ex. 4 | Bis A | $2.6 \times 10^{-5}$ | B | $8 \times 10^{-6}$ | $4 \times 10^{-5}$ | 5 | 15 | 5 | ○ |
| Comp. Ex. 1 | None | — | A | $5 \times 10^{-6}$ | $8 \times 10^{-4}$ | 160 | 9 | 4 | ○ |
| Comp. Ex. 2 | Bis A | $1.1 \times 10^{-3}$ | A | $5 \times 10^{-6}$ | $2 \times 10^{-4}$ | 40 | 200 | 4 | ○ |

INDUSTRIAL APPLICABILITY

The optical recording medium employing the light transmitting layer of the present invention shows little deterioration in signal properties even after being left to stand at high temperature under high humidity, and is thereby suitably applicable to e.g. a next generation high density optical recording medium employing blue laser.

The entire disclosure of Japanese Patent Application No. 2007-239974 filed on Sep. 14, 2007 including specification, claims, drawings and summary is incorporated herein by reference in its entirety.

The invention claimed is:

1. An optical recording medium capable of recording and reading by a blue laser, wherein the medium has a value of 10 or less for the value of an error rate after an environmental resistance test over the error rate before the environmental resistance test wherein the environmental resistance test is carried out by keeping the medium for 500 hours at a temperature of 80° C. under a relative humidity of 80%.

2. The optical recording medium according to claim 1, comprising at least a substrate, a recording/reading layer and a light transmitting layer, wherein the light transmitting layer comprises sulfur atoms and chlorine atoms in an amount of at least 15 ppm and at most 100 ppm in total.

3. The optical recording medium according to claim 1, further comprising a light transmitting layer, wherein the light transmitting layer comprises sulfur atoms and chlorine atoms in an amount of at least 19 ppm and at most 40 ppm in total.

4. The optical recording medium according to claim 2, wherein the recording/reading layer comprises a dielectric layer, a recording layer and a reflective layer.

5. The optical recording medium according to claim 2, wherein the light transmitting layer comprises a cover coat layer and a hard coat layer.

6. The optical recording medium according to claim 2, wherein the light transmitting layer comprises a compound having an epoxy group.

7. The optical recording medium according to claim 5, wherein the hard coat layer is formed from: a hard coat agent (1) comprising at least one of a silicone compound and a fluorine compound having an active energy ray-curable group at a terminal and containing no inorganic component; a hard coat agent (2) comprising a polymer having active energy ray-curable groups and at least one of a silicone unit and an organic fluorine group unit; or a hard coat agent (3) comprising at least one of a silicone compound and a fluorine compound having an active energy ray-curable group at a side chain.

8. The optical recording medium according to claim 5, wherein the cover coat layer is formed from a radiation-curable composition.

9. The optical recording medium according to claim 8, wherein the radiation-curable composition comprises (A): a urethane (meth)acrylate compound, (B): an acrylate compound other than the urethane (meth)acrylate compound (A), (C): a compound having at least one epoxy group in a molecule and (D): a polymerization initiator.

10. A method of recording and reading an optical recording medium, comprising recording and reading the optical recording medium according to claim 1 by a blue laser.

* * * * *